United States Patent
Lovranich et al.

(10) Patent No.: US 12,090,699 B2
(45) Date of Patent: Sep. 17, 2024

(54) APPARATUS AND METHOD FOR FILTRATION OF POLYMER MELT

(71) Applicant: STARLINGER & CO GESELLSCHAFT M.B.H., Wein (AT)

(72) Inventors: Christian Lovranich, Weissenbach an der Triesting (AT); Christopher Uhl, Eggendorf (AT); Christoph Weberhofer, Firth an der Triesting (AT); Andreas Pechhacker, Altenmarkt (AT)

(73) Assignee: STARLINGER & CO GESELLSCHAFT M.B.H., Wein (AT)

( * ) Notice: Subject to any disclaimer, the term of this patent is extended or adjusted under 35 U.S.C. 154(b) by 864 days.

(21) Appl. No.: 16/340,665

(22) PCT Filed: Oct. 3, 2017

(86) PCT No.: PCT/EP2017/075063
§ 371 (c)(1),
(2) Date: Apr. 9, 2019

(87) PCT Pub. No.: WO2018/069089
PCT Pub. Date: Apr. 19, 2018

(65) Prior Publication Data
US 2020/0047388 A1 Feb. 13, 2020

(30) Foreign Application Priority Data

Oct. 13, 2016 (EP) ..................................... 16193744

(51) Int. Cl.
B29C 48/255 (2019.01)
B01D 35/30 (2006.01)
(Continued)

(52) U.S. Cl.
CPC ........ B29C 48/2554 (2019.02); B29C 48/256 (2019.02); B01D 35/30 (2013.01);
(Continued)

(58) Field of Classification Search
CPC . B29C 48/2554; B29C 48/2725; B29C 48/69; B29C 48/694; B01D 2201/0453; B01D 2201/316; B01D 29/15
See application file for complete search history.

(56) References Cited

U.S. PATENT DOCUMENTS 3,669,166 A * 6/1972 Colin .................. B29C 48/6914
425/192 R
3,670,895 A * 6/1972 Goodpasture .......... B01D 35/30
210/167.31
(Continued)

FOREIGN PATENT DOCUMENTS

DE 19636067 3/1997
JP H10-244576 9/1998
(Continued)

OTHER PUBLICATIONS

International Search Report cited in PCT/EP2017/075063, dated Jan. 23, 2018.

*Primary Examiner* — Benjamin M Kurtz
(74) *Attorney, Agent, or Firm* — Workman Nydegger

(57) ABSTRACT

A device (1) for filtering plastic melt having an inlet valve (14), an outlet valve (15) and a filter canister (2), wherein a cavity (3) closable by means of a cover (4) is formed and into which a melt channel (20) opens. In the filter canister (2) there is arranged a plurality of filter cartridges (5), which are each formed by a filter substrate (6) and a filter lattice (7). The filter substrate (6) comprises a wall having openings, said wall defining an internal space (8), which opens through an outlet (9) into a collection channel (10). The filter lattice (7) covers the openings of the filter substrate (6). The melt
(Continued)

channel (20) is adjacent to the inlet valve (14) and may be brought into fluid communication with an outlet channel (16) via the inlet valve (14). The collection channel (10) is adjacent to the outlet valve (15) and may be brought into fluid communication with an outlet channel (18) via the outlet valve (15). The cover (4) fixes the filter lattices (7) onto the filter substrates (6).

12 Claims, 4 Drawing Sheets

(51) Int. Cl.
  *B29C 48/25*  (2019.01)
  *B29C 48/27*  (2019.01)
  *B29C 48/50*  (2019.01)
  *B29C 48/694*  (2019.01)

(52) U.S. Cl.
  CPC ........ *B29C 48/2725* (2019.02); *B29C 48/503* (2019.02); *B29C 48/694* (2019.02)

(56) References Cited

U.S. PATENT DOCUMENTS

| | | | |
|---|---|---|---|
| 3,896,029 A | | 7/1975 | Beuselinck |
| 3,940,222 A | | 2/1976 | Zink |
| 3,945,925 A | * | 3/1976 | Nicholson, Jr. ........ B01D 29/92 |
| | | | 210/455 |
| 4,921,607 A | | 5/1990 | Langley |
| 5,279,733 A | | 1/1994 | Heymans |
| 5,462,563 A | | 10/1995 | Hills |
| 5,462,653 A | | 10/1995 | Hills |
| 5,928,523 A | * | 7/1999 | Hobrecht ................ B29B 13/10 |
| | | | 210/323.1 |
| 2004/0026339 A1 | * | 2/2004 | Hills ..................... B01D 35/30 |
| | | | 210/742 |

FOREIGN PATENT DOCUMENTS

| | | |
|---|---|---|
| WO | 2002-42054 | 5/2002 |
| WO | 2002-056997 | 7/2002 |

* cited by examiner

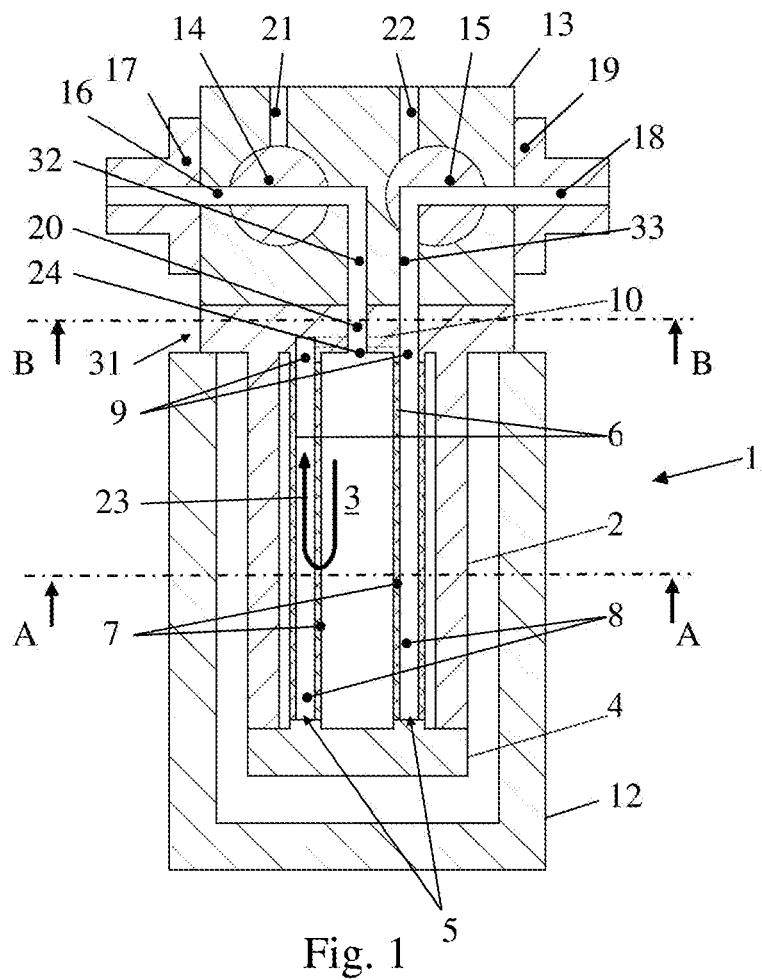
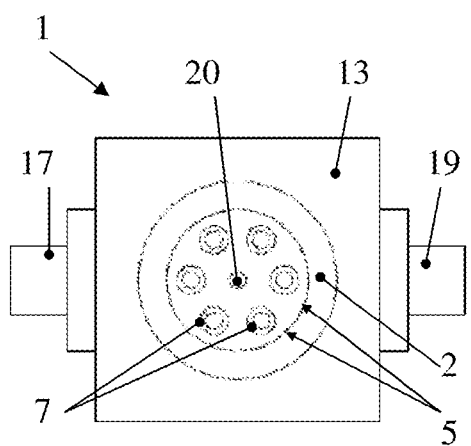
Fig. 2 (A-A)
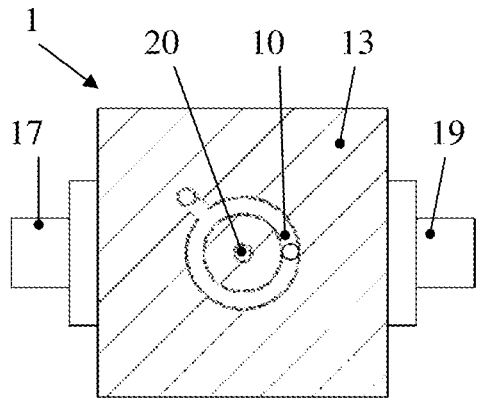
Fig. 3 (B-B)

APPARATUS AND METHOD FOR FILTRATION OF POLYMER MELT

The invention relates to a device for filtering plastic melt.

There have been known devices for filtering, in particular for large-scale filtering, plastic melt, wherein there is used a filter cartridge arranged in a filter canister for the filtration of the plastic melt, wherein such as filter cartridge is formed in general by a filter substance and a filter lattice as filter medium. Such a device is usually embedded in a continuous process, wherein plastic melt having a high recycling proportion is converted back to a high-quality starting product, for example plastic granulate. In order to being able to ensure a permanent high quality of the starting product and to prevent a blocking of the filter cartridge, the filter lattice of the filter cartridge has to be regularly replaced, leading to a regular interruption of the process and entraining personnel input.

A device described above is, for example, known from the publication CN 102241125 B, wherein the device known from CN 102241125 B has two filter cartridges, which are each arranged in filter canisters that are independent from one another. The filter canisters are attached to an inlet valve each via a melt channel, wherein plastic melt may only be supplied to respectively one of the two filter canisters. In this way, in the filtering operation of the device plastic melt is applied only onto one filter canister and the other filter canister, whereupon no plastic melt is applied, may simultaneously be cleaned, and the filter lattice of the filter cartridge may be replaced.

In the device known from the publication CN 102241125 B it has proven to be disadvantageous that the device has to be dimensioned rather large in order to obtain a sufficiently large filter surface for filtering the plastic melt, such that the replacement intervals of a filter lattice of filter cartridges, arranged in a filter canister, are spaced apart as far as possible. Due to the size of the device, however, there is required a lot of installation space, and it has proven to be difficult to arrange the device as part of a larger facility in such a way such that sufficient space is available in order to replace the filter lattices in a quick and effective way. There may be reached, however, by way of the device, a continuous filtration of plastic melt, but due to the small filter surface of the device and due to the time-consuming replacement of the filter lattices in the case of heavily contaminated plastic melt it may occur that a person, in order to ensure a continuous filtration, will be occupied only with the replacement of the filter lattices of the filter cartridges in the filter canisters in an alternating way.

Furthermore, there have been known devices for the filtration of plastic melts, which have a plurality of filter cartridges arranged in a filter canister. Such a device is, for example, known from DE 196 36 067 A1, JP H10 244576 A and WO 02/056997 A1.

Further device for filtering various media have been known from U.S. Pat. Nos. 5,279,733 A, 5,462,653 A, 4,921,607 A, WO 02/42054 A1, 3,670,895 A and 2,440,487 A.

U.S. Pat. No. 3,896,029 A discloses a valve, which allows for switching between two individual filters, without resulting in an interruption of a material flow at the exit of the filters.

U.S. Pat. No. 3,940,222 discloses a filter replacement valve unit for controlling the supply of melt to filter media.

It is the aim of the present invention to provide a device, wherein personnel input is rather low in order to maintain the filter operation in the device and wherein waste that has not been filtered is being prevented.

According to the invention, this task is solved by a device having an inlet valve, an outlet valve and filter canister. In the filter canister there is formed a cavity, which may be closed by means of a removable cover. A melt channel opens into the cavity, wherein in the cavity there is arranged a plurality of filter cartridges. The filter cartridges are each formed by a filter substrate and a filter lattice, wherein the filter cartridge is anchored to the filter canister and comprises a wall having a plurality of openings, with the wall defining an internal space, which opens into a collection channel via an outlet. The filter lattice is formed such that it covers the openings of the filter substrate, wherein the individual filter lattices are fixed onto the filter substrates via the cover. The wall of the filter substrate as well as the filter lattice are advantageously formed in the shape of a hollow cylinder. The melt channel is adjacent to the inlet valve and may be brought into fluid communication with an inlet channel via the inlet valve. The collection channel is adjacent to the outlet valve and may be brought into fluid communication with the outlet channel via the outlet valve. The device has a ventilation channel in communication with the inlet valve and a drainage channel in communication with the outlet valve, wherein the melt channel may be connected to the ventilation channel via the inlet valve and the collection channel may be connected to the drainage channel via the outlet valve.

This has the advantage that the cavity of the filter canister may be flushed by means of a gas, in particular air, before the replacement of the filter lattices. Flushing the cavity facilitates the replacement of the filter lattices, thus preventing that material that is not cleaned by the replacement will exit the device via the outlet channel.

By the configuration of a plurality of filter lattices in one single cavity of the filter canister there is obtained the advantage that the filter surface of the device is increased and, as a consequence, the device remains operable for a longer period of time, wherein the filter canister having a larger filter surfaces than conventional filter devices may be configured in the same size or even smaller. In consequence thereof, the interval between the replacements of the filter lattices is longer and, hence, the personnel input lower in order to maintain the device in the filter operation.

Furthermore, in the present invention all filter lattices of the filter cartridges arranged in the cavity of the filter canister are fixed onto the filter substrates by the cover. In order to replace the filter cartridges, hence, only the cover has to be removed, whereby the filter lattices in the cavity are freely accessible and may be pulled off or removed by means of a tool or manually of the filter substrates, of course in compliance with the respective safety measures. In this way, a replacement time of the plurality of filter lattices of the filter cartridges is rather short.

In an especially preferred embodiment the device may be heated in a contact-free way via a heating cup surrounding the filter canister spaced apart therefrom. In this way there is obtained the advantage that the filter canister may be heated across a large area, nevertheless enabling a fast replacement of the filter cartridges by simple removal of the heating cup.

The inlet valve and the outlet valve are advantageously formed by rotary and/or slidable valves. In this way there is given the advantage of a simple control of a supply of plastic melt into the cavity and a discharge of plastic melt out of the collection channel. Especially preferably the inlet valve and the outlet valve may be electronically controlled.

The melt channel and the collection channel are preferably formed in at least one wall of the filter canister in a region of a side of the filter canister. In this way, the cavity of the filter canister and the internal space of the filter substrates are flown through by the plastic melt in the filter operation essentially in the opposite direction, this is as a counter-flow. This gives rise to the advantage that the device in total may be configured in a compacter way.

Simultaneously, there is provided also a better accessibility to the filter medium or the filter lattices, respectively, as a channel configured for the supply of melt or discharge of melt does not constitute an obstacle to an easy access.

The filter lattice is usefully made from metal, plastic or ceramic material, wherein the filter cartridges are advantageously configured such that particles of essentially larger than 36 µm, preferably larger than 25 µm and more preferably larger than 15 µm are filtered out of the plastic melt in the filter operation of the device.

At last two of the inventive devices have been advantageously combined to a system, wherein the system has a control unit controlling the inlet valves and the outlet valves of the devices. In this way there is obtained the advantage that while the one device is used for filtering the plastic melt, the other device may be cleaned. Due to the replacement intervals of the filter lattices of the filter cartridges being spaced wide apart from one another because of the high filter surface of the plurality of filter lattices and due to the short replacement times of the filter lattices, the system may be continuously cleaned without great personnel input. In such a system, in particular a system having more than two devices, there is also given the possibility that the devices are simultaneously operated and that by adding individual devices or by switching off individual devices the total filtration surface of the system is altered. As a consequence, the total filtration surface may be adjusted to a contamination degree and a level of the volume flow of plastic melt supplied to the device. The devices are usefully oriented in parallel to one another, thus giving the advantage that the cavities of the filter canisters are accessible from the side and that, hence, the replacement of the filter cartridges is facilitated.

The replacement of the filter lattices of the filter cartridges of a device according to the invention is preferably carried out in the following steps:
  stopping a supply of plastic melt into the device by switching the inlet valve from a position connecting the inlet channel and the melt channel to a position connecting the ventilation channel and the melt channel;
  switching the outlet valve from a position connecting the outlet channel and the collection channel to a position connecting the drainage channel and the collection channel;
  flushing the device by suppling gas through the ventilation channel, wherein the gas is preferably pressurized;
  opening the cover and, if required, manually cleaning the melt residues still existent in the filter canister using a cleaning tool shaped according to the filter size;
  replacing the filter lattices;
  closing the cover;
  switching the inlet valve to the position, in which the inlet channel and the melt channel are connected to one another; and
  upon exit of the gas still existent in the cavity through the drainage channel, switching the outlet valve to the position, in which the outlet channel and the collection channel are connected to one another.

Further advantageous embodiment variants of the device according to the invention are explained in greater detail in the following by way of the figures.

FIG. 1 shows an embodiment variant of the device according to the invention in the filter operation in a schematic sectional view.

FIG. 2 shows the embodiment variant of the device according to FIG. 1 along a section A-A.

FIG. 3 shows the embodiment variant of the device according to FIG. 1 along a section B-B.

The FIGS. 4 to 7 show the embodiment variant of the device according to FIG. 1 in various configurations when replacing the filter lattices in schematic sectional views.

Figure 8:
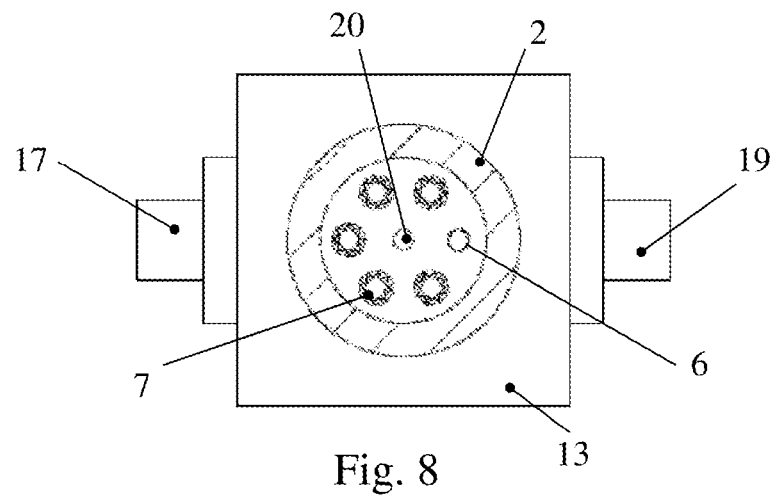

FIG. 8 shows the embodiment variant of the device according to FIG. 1 with the cover removed from underneath.

Figure 9:
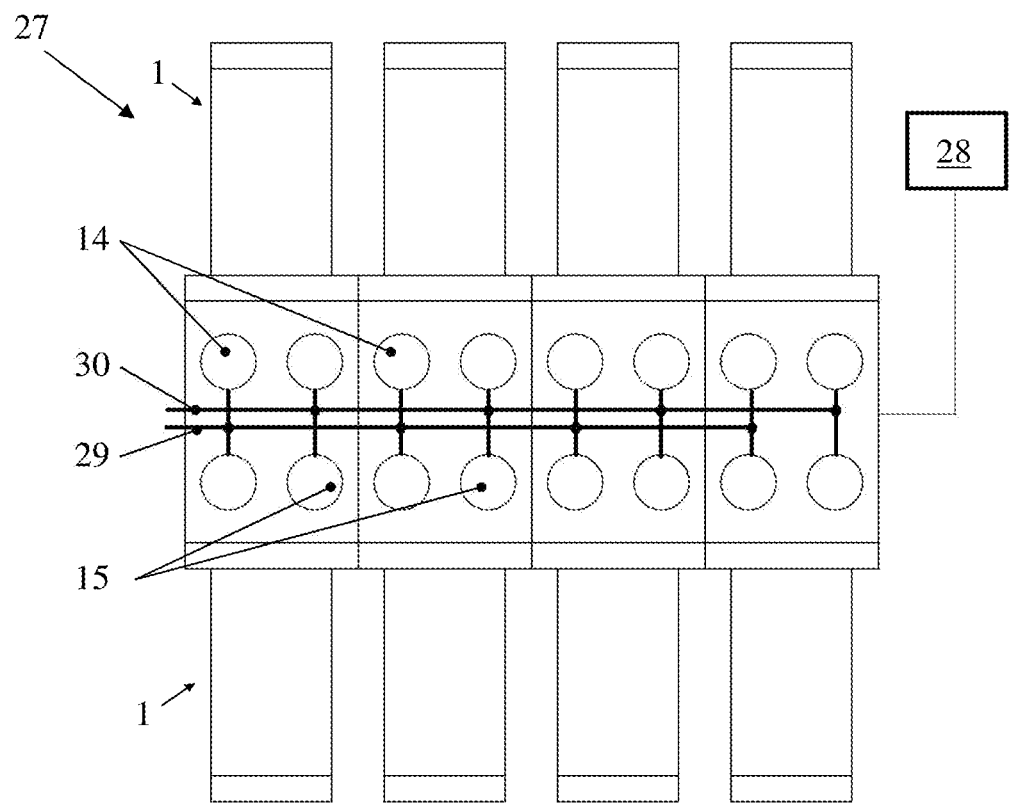

FIG. 9 shows one embodiment variant of a system according to the invention having eight devices according to FIG. 1 in a schematic depiction.

Figure 4:
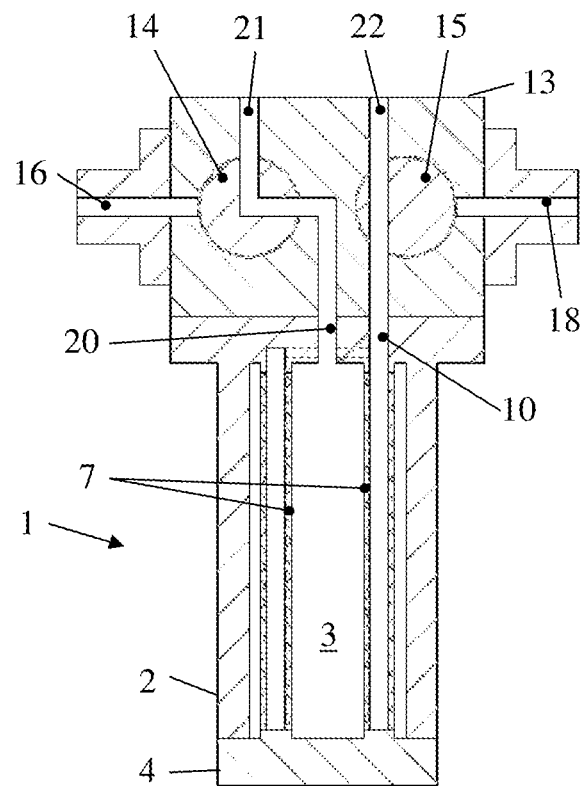
Figure 5:
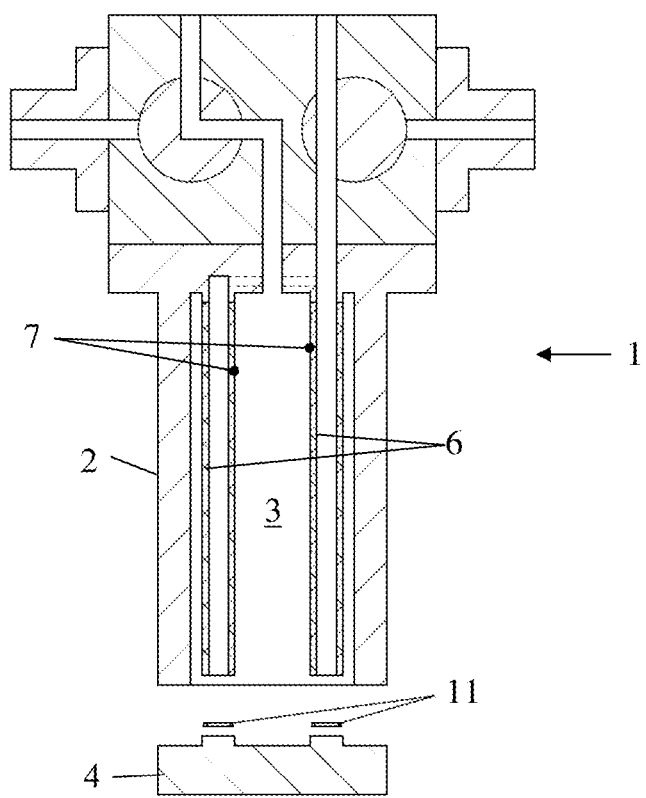
Figure 6:
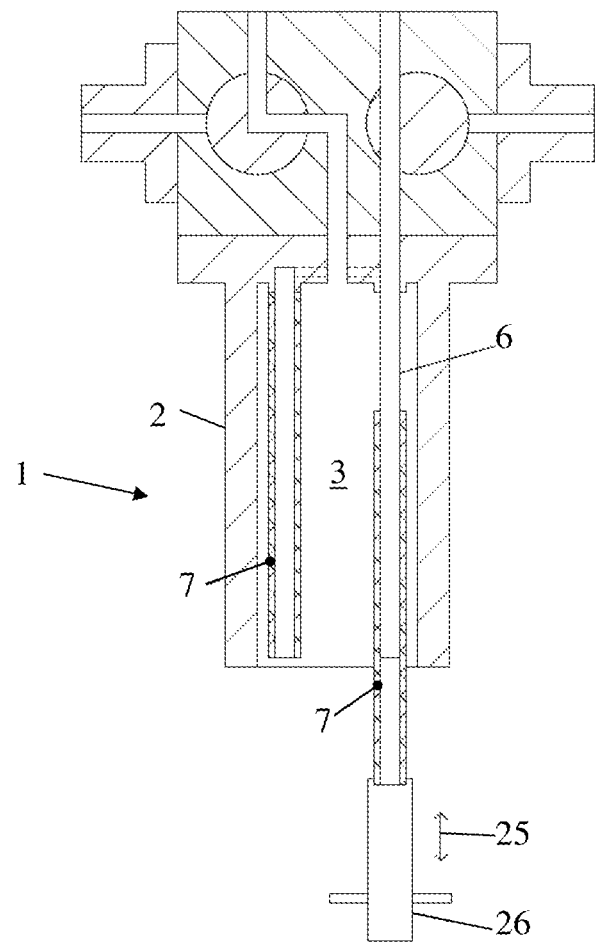
Figure 7:
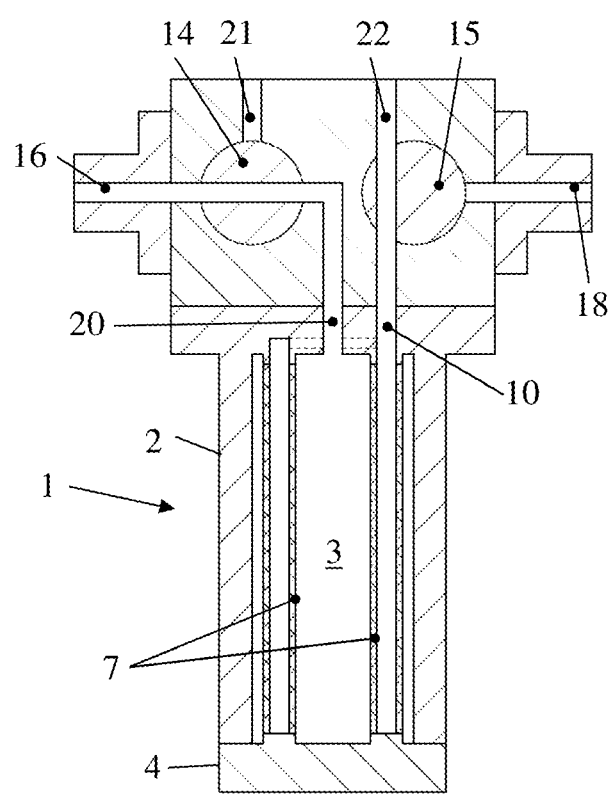

FIG. 1 shows an embodiment variant of the device 1 according to the invention in the filter operation in a schematic sectional view. The device 1 comprises a cup-like filter canister 2, in which there is formed a cylindrical cavity 3 and which is closed by means of a cover 4. In the cavity 3, there are arranged six filter cartridges 5, which filter cartridges 5 are each formed by a filter substrate 6 and a filter lattice 7. The filter substrates 6 are anchored to the filter canister 2 and have a cylindrical wall, which is formed by a perforated plate material, hence, having a plurality of openings. The openings are not depicted in the figures for reasons of better clarity. The wall of each filter substrate 6 defines a cylindrical internal space 8, which opens into a collection channel 10 formed in one wall 31 of the filter canister 2 via an outlet 9. The filter lattices 7 have the shape of a thick-walled hollow cylinder and are formed of plastic material. In a further embodiment variant the filter lattices 7 are made from metal, in particular a metal fibre fabric, or a ceramic material. The cover 4 may be removed from the filter canister 2, wherein the cover 4 is screwed onto the filter canister 2 by means of several screws not depicted. The cover 4 fixes in the screwed-on condition the filter lattices 7 onto the filter substrates 6, wherein gaskets 11 are formed between each wall of the filter substrates 6 and the cover 4 in order to prevent leakage between the internal spaces 8 and the cavity 3. The gaskets 11 are depicted in FIG. 5. A heating cup 12 is arranged surrounding the filter canister 2 spaced apart therefrom, which is configured to heat the filter canister 2 in a contact-free way. In a wall 31 of the filter canister 2 there is further formed a melt channel 20, which opens centrally into the cylindrical cavity 3. In this way there is obtained the advantage that all six filter cartridges 5 in the cavity 3 are arranged uniformly towards the mouth 24 of the melt channel 20.

The device 1 further has a melt distributer housing 13, which is adjacent to the wall 31 of the filter canister 2 and which is screwed thereto by way of screws not depicted. In the melt distributor housing 13 there are configured an inlet valve 14 and an outlet valve 15, wherein the inlet valve 14 is a slidable valve and the outlet valve 15 is a slidable valve. The inlet valve 14 is directly connected to the melt channel 20 via a supply channel 32, and the outlet valve 15 is directly connected to the melt channel 10 via a discharge channel 33. Furthermore, there is configured in the melt distributor housing 13 an inlet channel 16, which opens from a first connecting element 17 into the inlet valve 14, and an outlet channel 18, which opens from a second connecting element 19 into the outlet valve 15. Furthermore, in the melt distributor housing 13 there are further formed a ventilation channel 21 and a drainage channel 22, wherein the ventilation channel 21 opens into the inlet valve 14 and wherein the drainage channel 22 opens into the outlet valve 15.

In FIG. 1 the inlet valve 14 and the outlet valve 15 are in a position corresponding to the filter operation of the device 1. In the filter operation, plastic melt to be filtered is supplied to the device 1 via the inlet channel 16, whereby there is formed a filter flow via the inlet valve 14, the supply channel 32, the melt channel 20, the cavity 3, through the filter lattices 7 and the openings of the walls of the filter substrates 6, farther via the collection channel 10, the discharge channel 33, the outlet valve 15 into the outlet channel 18, wherein the filtration of the plastic melt is carried out when the plastic melt passes through the filter lattices 7. The filter flow through a filter lattice 7 and the openings of a wall of a filter substrate 6 is indicated in FIG. 1 by the arrow 23. As the collection channel 10 as well as the melt channel 20 are formed in the wall 31, the cavity 3 is flown through in the filter operation essentially in the opposite direction to the internal spaces 8 of the filter cartridges 5 by the plastic melt. As a consequence, the device 1 is operated in a counter-flow and thus may be configured in a very compact way. During the filter operation the filter canister 2 is kept at a constant temperature by the heating cup 12 in order to ensure a possibly low viscosity of the plastic melt.

FIG. 2 shows the embodiment variant of the device 1 according to FIG. 1 along a section A-A.

FIG. 3 shows the embodiment variant of the device 1 according to FIG. 1 along a section B-B.

The FIGS. 4 to 7 show the embodiment variant of the device 1 according to FIG. 1 in various configurations when replacing the filter lattices 7 in schematic sectional view. In order to replace the filter lattices 7, there is firstly removed the heating cup 12 from the filter canister 2. Subsequently, the supply of plastic melt to the device 1 and, hence, the filter operation is interrupted by switching the inlet valve 14 from a position connecting the inlet channel 16 and the melt channel 20 to a position connecting the ventilation channel 21 and the melt channel 20. In the next step, the outlet valve 15 is switched from a position connecting the outlet channel 18 and the collection channel 10 to apposition connecting the drainage channel 22 and the collection channel 10. See FIG. 4. Switching of inlet valve 14 and outlet valve 15 may also be carried out simultaneously. By supplying a pressurized gas, for example, air, through the ventilation channel 21, the cavity 3 and the internal spaces 8 of the filter cartridges 5 are flushed, wherein the plastic melt from the drainage channel 22 is pressed into a drainage container not depicted that is connected to the drainage channel 22 either directly or via a line.

Subsequently, the cover 4 is screwed off and removed from the filter canister 2, whereby the filter lattices 7 are no longer fixed to the filter substrates 6 and may be pulled off the filter substrates 6 by means of a tool 26 axially in the direction of the arrow 25 and removed from the cavity 3. See FIG. 5 and FIG. 6. The gaskets 11 are either removed immediately upon removal of the cover 4 from the filter lattices 7, or they are removed simultaneously with the filter lattices 7 using the tool 26. If required, there may additionally be carried out a cleaning process of the cavity 3 in this condition. Then new or cleaned filter lattices 7 are applied to the filter substrates 6 by means of the tool 26. The filter lattices 7 are advantageously applied onto the filter substrates 6 by means of the tool 26 in a pre-heated condition.

Upon application of the new or cleaned filter lattices 7, there are arranged new or cleaned gaskets 11 at the filter lattices 7 or in the cover 4 in respective notches that are not depicted, and the gaskets 11 and the filter lattices 7 are again fixed between the cover 4 and the filter substrates 6 by placing the cover 4 thereupon. See FIG. 7. As a consequence, the inlet valve 14 is again switched to the position, in which the inlet channel 16 and the melt channel 20 are connected to one another, and the cavity 3 is again filled with plastic melt. As soon as filtered plastic melt exits the drainage channel 22, the gas used for flushing the cavity 3 and the internal spaces 8 of the filter cartridges 5 has been discharged, and the outlet valve 15 is switched to the position, in which the outlet channel 18 and the collection channel 10 are connected to one another. The device 1 is again in filter operation.

FIG. 8 shows the embodiment variant of the device 1 according to FIG. 1 having the heating cup 12 removed and the cover 4 taken off, from above, wherein there has already been removed a filter lattice 7 from one filter substrate 6 by means of the tool 26.

FIG. 9 shows an embodiment variant of a system 27 according to the invention having eight devices 1 according to FIG. 1 in a schematic depiction. The system 27 further comprises a control unit 28 formed by a computer or a micro-controller, which is connected to all eight devices 1 for data exchange. All inlet channels 16 of the device 1 are connected to a supply line 29, and all outlet channels 18 of the device 1 are connected to a discharge line 30. Also the ventilation channels 21 and the drainage channels 22 are each coupled to one another via a line, wherein the lines are not depicted in FIG. 9 for reasons of better clarity. The control unit 28 controls the function of the inlet valves 14 and of the outlet valves 15 of the devices 1, controlling these advantageously in a completely automatic way in the operation of the system 27. Individual devices 1 that are controlled by the control unit 28 may be added or switched off. This is realized either in order to clean individual devices 1 or in order to adjust a total filtration surface of the system 27 to a volume flow and contamination level of the plastic melt. For reasons of clarity, also the heating cups 12 of the individual devices 1 are not depicted in FIG. 9.

The inventio claimed is:
1. A device for filtering plastic melt comprising:
an inlet valve;
an outlet valve;
a filter canister comprising a melt channel with a mouth formed in a wall;
a removable cover configured to form a cavity when attached to the filter canister, wherein the mouth of the melt channel is in direct fluid communication with and opens directly into the cavity and the removable cover comprises a plurality of raised portions, the raised portions being opposite the mouth,
wherein a plurality of filter cartridges are arranged in the cavity and each of the filter cartridges is formed by a filter substrate and a filter lattice,
wherein the filter substrate is anchored to the wall of the filter canister opposite the removable cover when the removable cover is attached, the filter substrate comprising a wall having a plurality of openings, said wall defining an internal space, which opens through an outlet into a collection channel,
wherein the filter substrate extends from the wall towards and is closed at a terminal end by one of the plurality of raised portions of the removable cover when the removable cover is attached to the filter canister;
wherein the filter lattice covers the openings of the filter substrate, wherein the melt channel is adjacent to the inlet valve and is configured to be brought into fluid communication with an inlet channel via the inlet valve, wherein the collection channel is adjacent to the outlet valve and is configured to be brought into fluid communication with an outlet channel via the outlet valve, and wherein the removable cover fixes the filter lattices onto the filter substrates, a ventilation channel in communication with the inlet valve;

a drainage channel in communication with the outlet valve, wherein the melt channel is configured to be connected to the ventilation channel via the inlet valve and the collection channel is configured to be connected to the drainage channel via the outlet valve; and a heat cup that is arranged to surround the filter canister and the removable cover when attached and configured to heat the filter canister, wherein the heat cup is spaced apart from the filter canister.

2. The device according to claim 1, wherein the filter substrates are arranged in the cavity evenly spaced apart from one another.

3. The device according to claim 1, wherein the inlet valve and the outlet valve are formed by rotary and/or slidable valves.

4. The device according to claim 1, wherein the melt channel and the collection channel are formed in at least one wall of the filter canister in a region of a side of the filter canister.

5. The device according to claim 1, wherein the filter cartridges are oriented in a way such that the filter lattices may be removed axially from the cavity after the cover has been removed.

6. The device according to claim 1, wherein the filter cartridges are adapted to filter particles having a size of essentially larger than 36 um out of the plastic melt in the filter operation of the device.

7. The device according to claim 1, wherein the wall of the filter substrate is made from a perforated sheet material.

8. The device according to claim 1, wherein the filter cartridges are made from metal, plastic or ceramic material.

9. The device according to claim 1, wherein the device has gaskets, which may be fixed to the filter cartridges and which are arranged at the cover placed on the filter canister between filter lattices and the cover.

10. The device according to claim 1, wherein the filter substrates are arranged in the cavity evenly spaced apart from one another and have the same distance starting from the aperture of the melt channel into the cavity.

11. The device according to claim 1, wherein the filter cartridges are adapted to filter particles having a size of essentially larger than 25 μm.

12. The device according to claim 1, wherein the filter cartridges are adapted to filter particles having a size of essentially larger than 15 μm.

* * * * *